US011821878B2

United States Patent
Ando et al.

(10) Patent No.: US 11,821,878 B2
(45) Date of Patent: Nov. 21, 2023

(54) AUTOSAMPLER

(71) Applicant: SHIMADZU CORPORATION, Kyoto (JP)

(72) Inventors: Shotaro Ando, Kyoto (JP); Takashi Inoue, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 464 days.

(21) Appl. No.: 17/285,532

(22) PCT Filed: Oct. 23, 2018

(86) PCT No.: PCT/JP2018/039391
§ 371 (c)(1),
(2) Date: Apr. 15, 2021

(87) PCT Pub. No.: WO2020/084696
PCT Pub. Date: Apr. 30, 2020

(65) Prior Publication Data
US 2021/0389283 A1 Dec. 16, 2021

(51) Int. Cl.
G01N 30/24 (2006.01)
G01N 35/10 (2006.01)
G01N 30/02 (2006.01)

(52) U.S. Cl.
CPC ......... *G01N 30/24* (2013.01); *G01N 35/1004* (2013.01); *G01N 35/1079* (2013.01); *G01N 2030/027* (2013.01)

(58) Field of Classification Search
CPC ............... G01N 30/24; G01N 35/1004; G01N 35/1079; G01N 35/1095; G01N 2030/027
See application file for complete search history.

(56) References Cited

U.S. PATENT DOCUMENTS

2009/0041622 A1* 2/2009 Maeda ................. B08B 9/0321
422/63
2013/0019697 A1* 1/2013 McKeen .......... G01N 35/00029
73/863.21
(Continued)

FOREIGN PATENT DOCUMENTS

JP 2017-207391 A 11/2017

OTHER PUBLICATIONS

International Search Report for corresponding Application No. PCT/JP2018/039391, dated Dec. 11, 2018.
(Continued)

*Primary Examiner* — Suman K Nath
(74) *Attorney, Agent, or Firm* — Renner, Otto, Boisselle & Sklar, LLP

(57) ABSTRACT

An autosampler includes an injection port for supplying a sample to an analysis device, a needle that collects the sample stored in a vial and injects the sample into the injection port, a cleaning unit that cleans the needle and a gas exhaust fan. The cleaning unit includes a cleaning container which stores a cleaning liquid and into which the needle is inserted, and a unit main body that has a space for storing the cleaning container and receiving the cleaning liquid overflowing from the cleaning container, and a unit gas exhaust passage for exhausting gas in the space outwardly of the cleaning unit. The unit main body has a unit opening through which the needle passes when accessing the cleaning container. The autosampler includes a boundary portion that separates a first region in which the injection port, the needle and the unit opening are arranged from a second region in which the gas exhaust fan is arranged, and a gas exhaust region which is connected to the unit gas exhaust passage via a gas exhaust opening provided at the boundary portion and (Continued)

into which gas exhausted from the space flows due to a negative pressure generated by the gas exhaust fan.

9 Claims, 16 Drawing Sheets

(56) References Cited

U.S. PATENT DOCUMENTS

2013/0067997 A1\* 3/2013 Ebsen .................... G01N 30/20
  73/61.55
2019/0072577 A1\* 3/2019 Konishi ................. G01N 35/04

OTHER PUBLICATIONS

Written Opinion for corresponding Application No. PCT/JP2018/039391, dated Dec. 11, 2018 (Machine Translation).

\* cited by examiner

F I G. 2
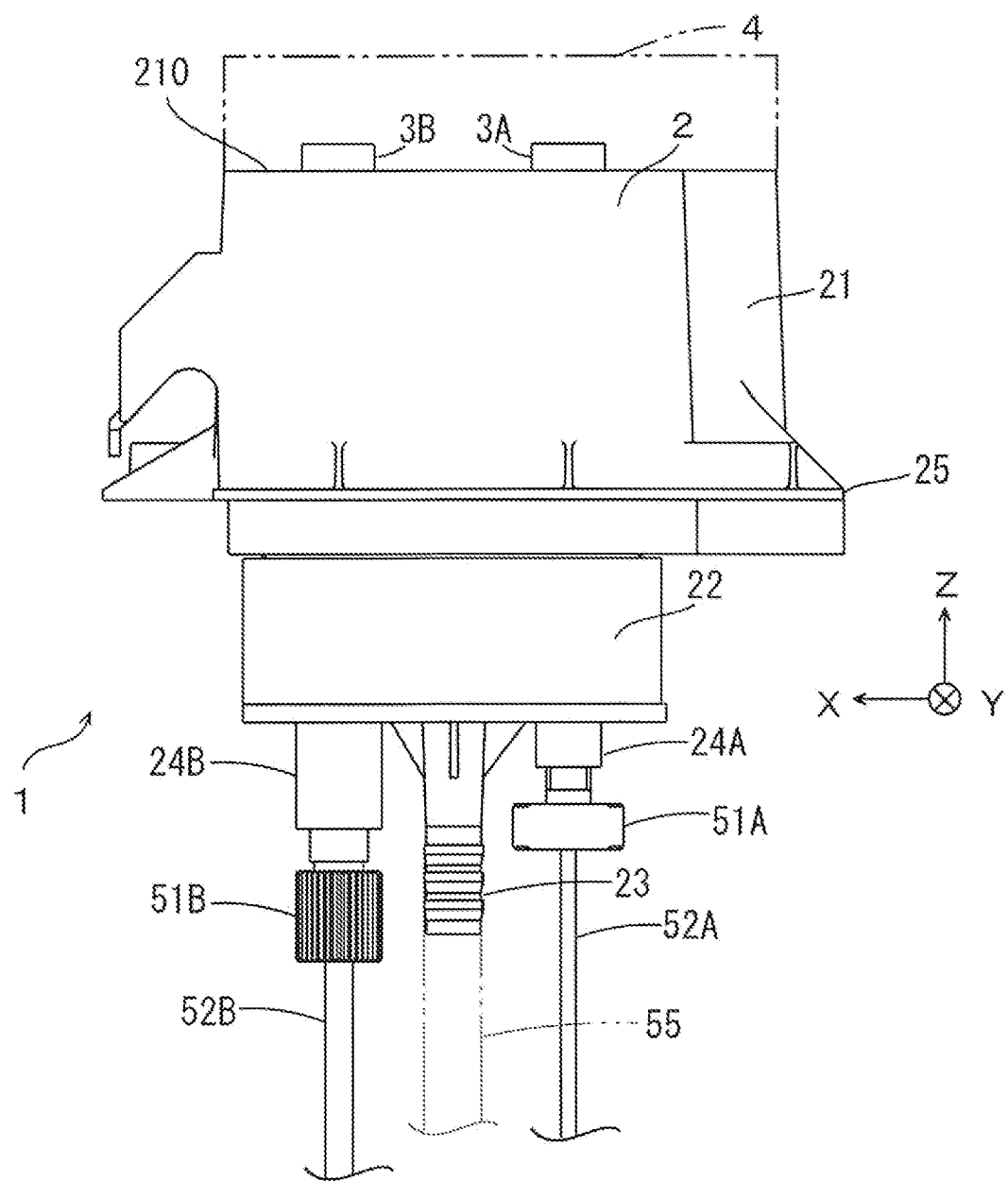

F I G. 4
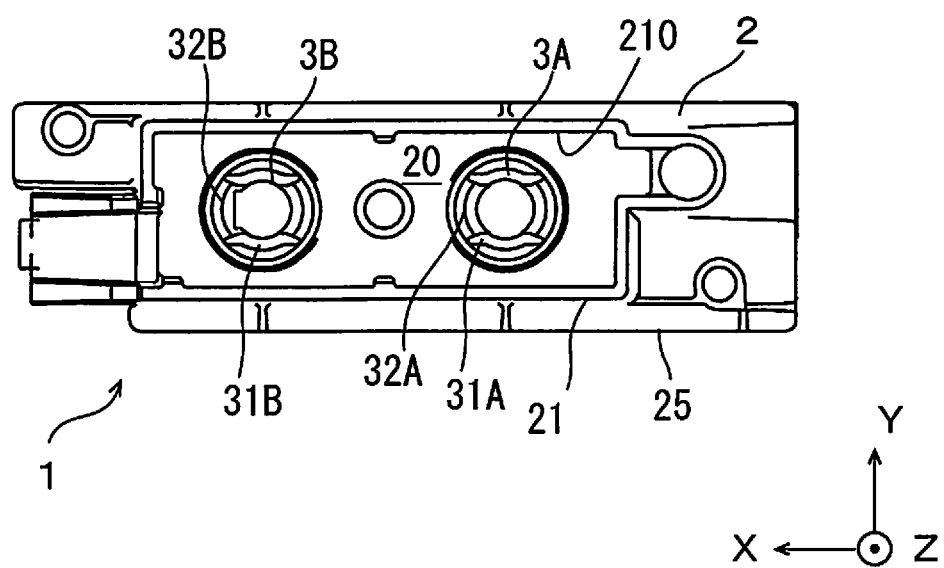

F I G. 7
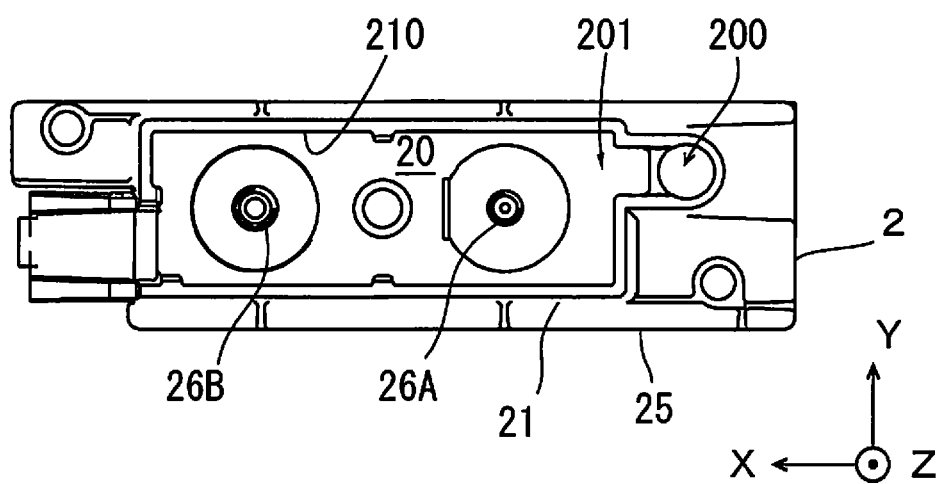

AUTOSAMPLER

TECHNICAL FIELD

The present invention relates to an autosampler that supplies a sample to be analyzed to an analysis device.

BACKGROUND ART

There is an autosampler that is used by an analysis device such as a liquid chromatograph. A needle included in the autosampler collects a sample from a vial storing the sample to be analyzed and injects the collected sample into an analysis flow path of the liquid chromatograph. The autosampler can supply samples stored in a plurality of vials successively to the analysis flow path of the liquid chromatograph.

After a sample is supplied to the analysis flow path by the autosampler, part of the sample may remain in a needle of the autosampler. For example, a sample adsorbs on the needle, thereby remaining in the needle. The remaining sample adsorbed on the needle may be mixed with a sample supplied to the analysis flow path in a step of supplying a next sample. The mixed remaining sample influences a result of analysis in the liquid chromatograph. For example, a component of the mixed remaining sample appears as a subtle peak in a result of analysis of the next sample. This phenomenon is referred to as carryover. It is required that carryover is minimum as performance of the autosampler.

As measures against carryover, the needle is cleaned before and after a step of sucking a sample. The needle is cleaned by insertion of the needle into a rinse port filled with a cleaning liquid. Alternatively, the needle is cleaned by suction and discharge of the cleaning liquid filling the rinse port by the needle (see Patent Document 1, for example).

Various liquids are selected in accordance with an analysis condition or a sample type as a cleaning liquid to be used in the rinse port. Further, a highly corrosive liquid such as chlorine may be used as a cleaning liquid. When a highly corrosive cleaning liquid stored in the rinse port is evaporated, an evaporated gas fills the autosampler. Thus, a metallic member in a casing of the autosampler may rust due to an evaporated highly corrosive gas.

As such, it is necessary to have a mechanism for preventing rusting by regularly ventilating the casing of the autosampler. There is a conventional autosampler including a gas exhaust fan at a side surface of a casing as the mechanism. Thus, air in the autosampler is ventilated regularly by the gas exhaust fan.

[Patent Document 1] JP 2017-207391 A

SUMMARY OF INVENTION

Technical Problem

A method of ventilating the autosampler with use of a fan provided at the side surface of the casing of the autosampler requires a long period of time for ventilation. With an autosampler having a large casing, it requires a particularly long period of time for ventilation.

Further, there is an autosampler that includes a cooling system for cooling air in the autosampler for the purpose of preventing condensation or the purpose of realizing a uniform cooling temperature. The method of ventilating the autosampler with use of a gas exhaust fan exhausts the air cooled by the cooling system outwardly of the casing and lowers cooling performance.

An object of the present invention is to exhaust gas evaporated from a rinse port outwardly of an autosampler without requiring a long period of time for ventilating a casing of the autosampler and lowering cooling performance in the casing of the autosampler.

Solution to Problem (1) An autosampler according to one aspect of the present invention supplies a sample to an analysis device, and includes an injection port for supplying the sample to be analyzed to the analysis device, a needle that collects the sample to be analyzed stored in a vial and injects the sample to be analyzed into the injection port, a cleaning unit that cleans the needle, and a gas exhaust fan. The cleaning unit includes a cleaning container which stores a cleaning liquid and into which the needle that needs to be cleaned is inserted in the stored cleaning liquid, and a unit main body that has a space for storing the cleaning container and receiving the cleaning liquid overflowing from the cleaning container, and a unit gas exhaust passage for exhausting gas in the space outwardly of the cleaning unit. The unit main body has a unit opening through which the needle passes when accessing the cleaning container. The autosampler further includes a boundary portion that separates a first region in which the injection port, the needle and the unit opening are arranged from a second region in which the gas exhaust fan is arranged, and a gas exhaust region which is connected to the unit gas exhaust passage via a gas exhaust opening provided at the boundary portion and into which gas exhausted from the space flows due to a negative pressure generated by the gas exhaust fan.

In this autosampler, the first region in which the injection port, the needle and the unit opening are arranged is separated from the second region in which the exhaust fan is arranged by the boundary portion. The space in the cleaning unit is connected to the gas exhaust region in the second region through the unit gas exhaust passage in the cleaning unit. The gas in the space of the cleaning unit is exhausted to the gas exhaust region in the second region through the unit gas exhaust passage and the gas exhaust opening provided at the boundary portion due to a negative pressure generated by the gas exhaust fan.

With this autosampler, the gas in the cleaning unit is exhausted to the second region through the unit gas exhaust passage in the cleaning unit. Thus, the gas in the cleaning unit is prevented from flowing out via the unit opening and filling the first region. Even in a case where a highly corrosive liquid such as chlorine is used as the cleaning liquid, an evaporated gas is prevented from filling the first region. Thus, rusting of a metallic member in the first region due to a highly corrosive gas is prevented.

With this autosampler, the gas flowing out from the cleaning unit does not fill the first region. Therefore, it is not necessary to provide a gas exhaust fan at a side surface of the casing of the autosampler and ventilate the first region as conventionally done, and a period of time required to ventilate the first region is shortened. Further, because this autosampler does not ventilate the first region with a gas exhaust fan, cooling performance in the first region is not lowered.

(2) The unit main body may have a partition wall that separate the space from the unit gas exhaust passage, and gas in the space is exhausted to the unit gas exhaust passage via a partition wall opening provided at the partition wall. The partition wall separates the space for receiving the cleaning liquid overflowing from the cleaning container from the space to which gas is exhausted.

(3) The unit gas exhaust passage may extend in an up-and-down direction. The gas exhausted from the partition wall opening flows in the up-and-down direction and is exhausted.

(4) The partial wall opening may be provided at an upper end of the partition wall. A large space that receives the cleaning liquid overflowing from the cleaning container can be ensured.

(5) The cleaning unit may include a cleaning unit cover that covers the unit opening while enabling the needle to access the cleaning container.

This autosampler includes the cleaning unit cover that covers the unit opening of the cleaning unit, so that the gas in the cleaning unit is further prevented from filling the first region. Thus, rusting of a metallic member in the first region due to a highly corrosive gas is effectively prevented.

(6) The cleaning unit cover may be provided on a path through which the needle passes when accessing the cleaning container, and may have a cap provided to enable the needle to access the cleaning container.

Because the cleaning unit cover has the cap on the path through which the needle passes, the gas in the cleaning unit is further prevented from filling the first region. Further, while a portion through which the needle passes in the cleaning unit cover may be contaminated by a sample or the like, it is possible to remove a contaminated portion by replacing the cap.

(7) The cap may have a hole through which the needle passes. Except for a portion including a hole through which the needle passes, the space in the cleaning unit is separated from the first region.

(8) The cap may have a hole region in which a hole through which the needle passes is to be formed when the cap is pierced by the needle.

The hole though which the needle passes is not present until the needle passes. The space in the cleaning unit is effectively separated from the first region. The gas in the cleaning unit is further effectively prevented from flowing into the first region.

(9) The autosampler may further include an external gas exhaust passage through which gas that has flowed into the gas exhaust region from the space due to a negative pressure generated by the gas exhaust fan is sent outwardly of the autosampler.

The gas that has flowed into the gas exhaust region in the second region is further sent outwardly of the autosampler. A member in the second region is also prevented from being contaminated by the gas.

Advantageous Effects of Invention

With the present invention, it is possible to exhaust gas evaporated form a rinse port outwardly of an autosampler without requiring a long period of time to ventilate a casing of the autosampler and lowering cooing performance in the casing of the autosampler.

BRIEF DESCRIPTION OF THE DRAWINGS

FIG. 2 is a side view of a rinse port 1 according to the present embodiment.

FIG. 4 is a plan view of the rinse port 1.

FIG. 7 is a plan view of the rinse port main body 2.

DESCRIPTION OF EMBODIMENTS

An autosampler 7 according to embodiments of the present invention will be described below in detail with reference to the drawings.

(1) OVERALL CONFIGURATION OF LIQUID CHROMATOGRAPH

Figure 1:
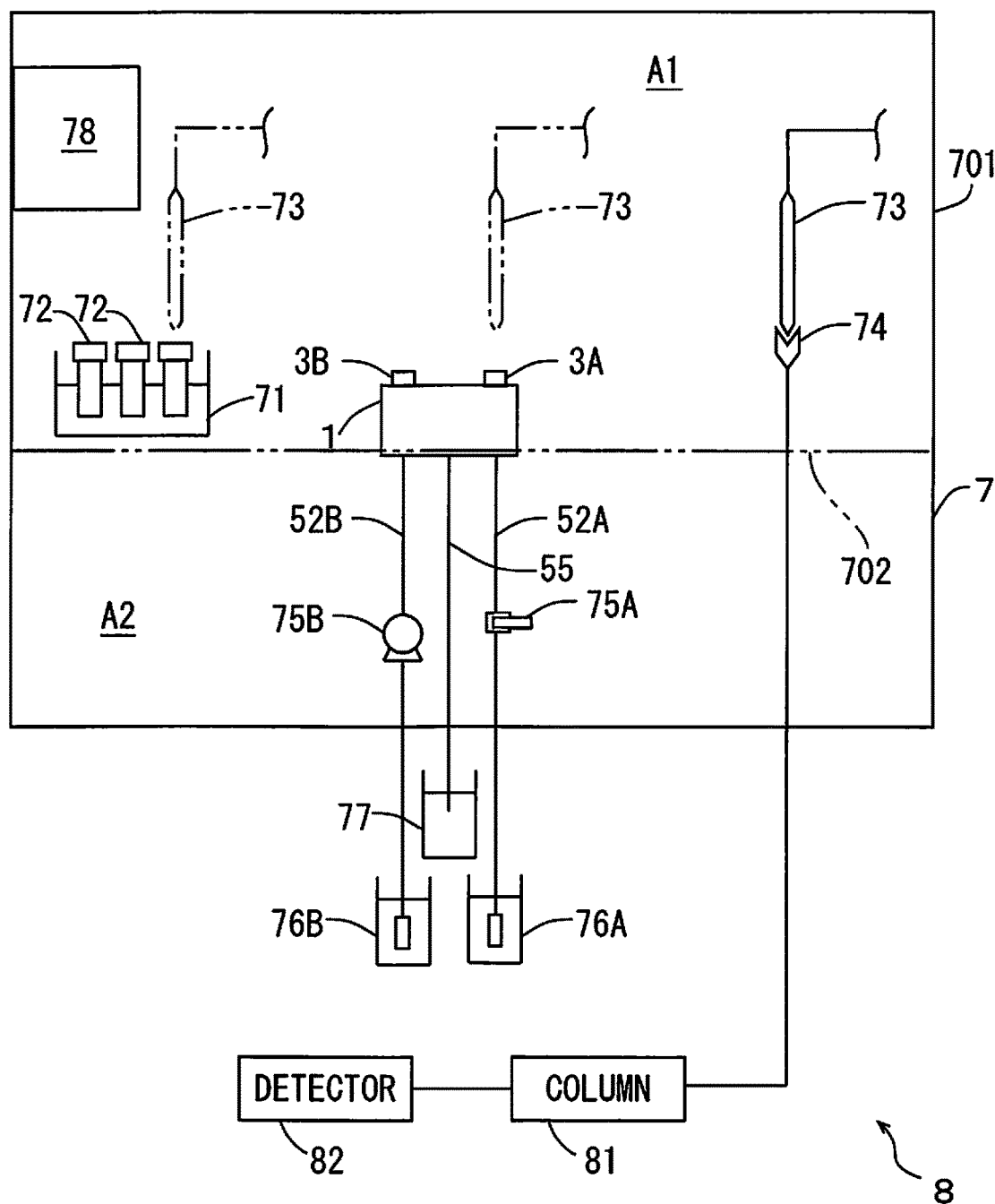
FIG. 1 is a overview showing a liquid chromatograph 8 to which an autosampler 7 according to a present embodiment is connected.

FIG. 1 is an overview showing a liquid chromatograph 8 that uses the autosampler 7 according to the present embodiment. As shown in FIG. 1, the liquid chromatograph 8 includes the autosampler 7, a column 81 and a detector 82. The autosampler 7 includes a rinse port 1, a needle 73, an injection port 74, a cooling system 78, liquid sending tubes 52A, 52B, a liquid drainage tube 55 and pumps 75A, 75B. Cleaning liquid tanks 76A, 76B and a liquid drainage tank 77 are provided outwardly of the autosampler 7.

A sample plate 71 is arranged at a predetermined location in the autosampler 7. A plurality of sample vials 72 are arranged in the sample plate 71. A sample is stored in a sample vial 72. The needle 73 is movable among the sample vials 72, the rinse port 1 and the injection port 74. The needle 73 collects a sample from a sample vial 72. The needle 73 supplies the sample to the column 81 by injecting the sample into the injection port 74. After the sample is injected into the injection port 74 or the sample is collected from the sample vial 72, the needle 73 is cleaned in the rinse port 1.

The rinse port 1 stores cleaning containers 3A, 3B. The liquid sending tube 52A is connected to the cleaning container 3A. The end of the liquid sending tube 52A is arranged in the cleaning liquid tank 76A. The pump 75A is connected to the liquid sending tube 52A between the cleaning container 3A and the cleaning liquid tank 76A. With this configuration, when the pump 75A is driven, the cleaning liquid in the cleaning liquid tank 76A is sent to the cleaning container 3A through the liquid sending tube 52A. In the present embodiment, the pump 75A serves as both of a cleaning liquid pump for sending the cleaning liquid stored in the cleaning liquid tank 76A to the cleaning container 3A and a metering pump for collecting and discharging a sample with the use of the needle 73. For example, a pump that can adjust a flow rate with high accuracy is used as the pump 75A. In FIG. 1, a valve, a liquid sending path and so on provided between the pump 75A and the needle 73 are not shown.

The liquid sending tube 52B is connected to the cleaning container 3B. The end of the liquid sending tube 52B is arranged in the cleaning liquid tank 76B. The pump 75B is connected to the liquid sending tube 52B between the cleaning container 3B and the cleaning liquid tank 76B. With this configuration, when the pump 75B is driven, the cleaning liquid in the cleaning liquid tank 76B is sent to the cleaning container 3B through the liquid sending tube 52B. In the present embodiment, the pump 75B is a dedicated pump for sending the cleaning liquid stored in the cleaning liquid tank 76B to the cleaning container 3B. As the pump 75B, a pump having a volume larger than that of the pump 75A is used, for example.

The autosampler 7 has a casing 701. Further, the autosampler 7 has a boundary portion 702. The space in the autosampler 7 is sectioned into a first region A1 and a second region A2 by the boundary portion 702. In the first region A1, the rinse port 1, the sample plate 71, the needle 73, the injection port 74 and the cooling system 78 are arranged. In the second region A2, the liquid sending tubes 52A, 52B, the liquid drainage tube 55 and the pumps 75A, 75B are arranged.

The first region A1 is covered by the casing 701 and the boundary portion 702 and closed from the outside of the autosampler 7. The first region A1 is cooled by the cooling system 78. The cooling system 78 includes a fan that circulates air in the first region A1, and the entire first region A1 is cooled.

The second region A2 is separated from the first region A1 by the boundary portion 702. While the second region A2 is partially separated from the outside of the autosampler 7 by the casing 701, the entire region is not separated from the outside. That is, differently from the first region A1, the second region A2 is not closed from the outside of the autosampler 7. While the first region A1 and the second region A2 are connected to each other via a portion through which the cleaning liquid or the like is sent, the first region A1 and the second region A2 are separated from each other in the rest. Air in the region cannot move between the first region A1 and the second region A2. Description will be provided below. Thus, although the second region A2 is not closed from the outside, the cooling effect in the first region A1 is maintained.

As described above, the liquid chromatograph 8 includes the column 81 and the detector 82. A sample that has been injected into the injection port 74 by the needle 73 is sent to the column 81. A sample continuously sent from the autosampler 7 is supplied to the column 81. A sample that is separated into components in the column 81 is detected by the detector 82.

(2) OVERALL CONFIGURATION OF RINSE PORT

Figure 3:
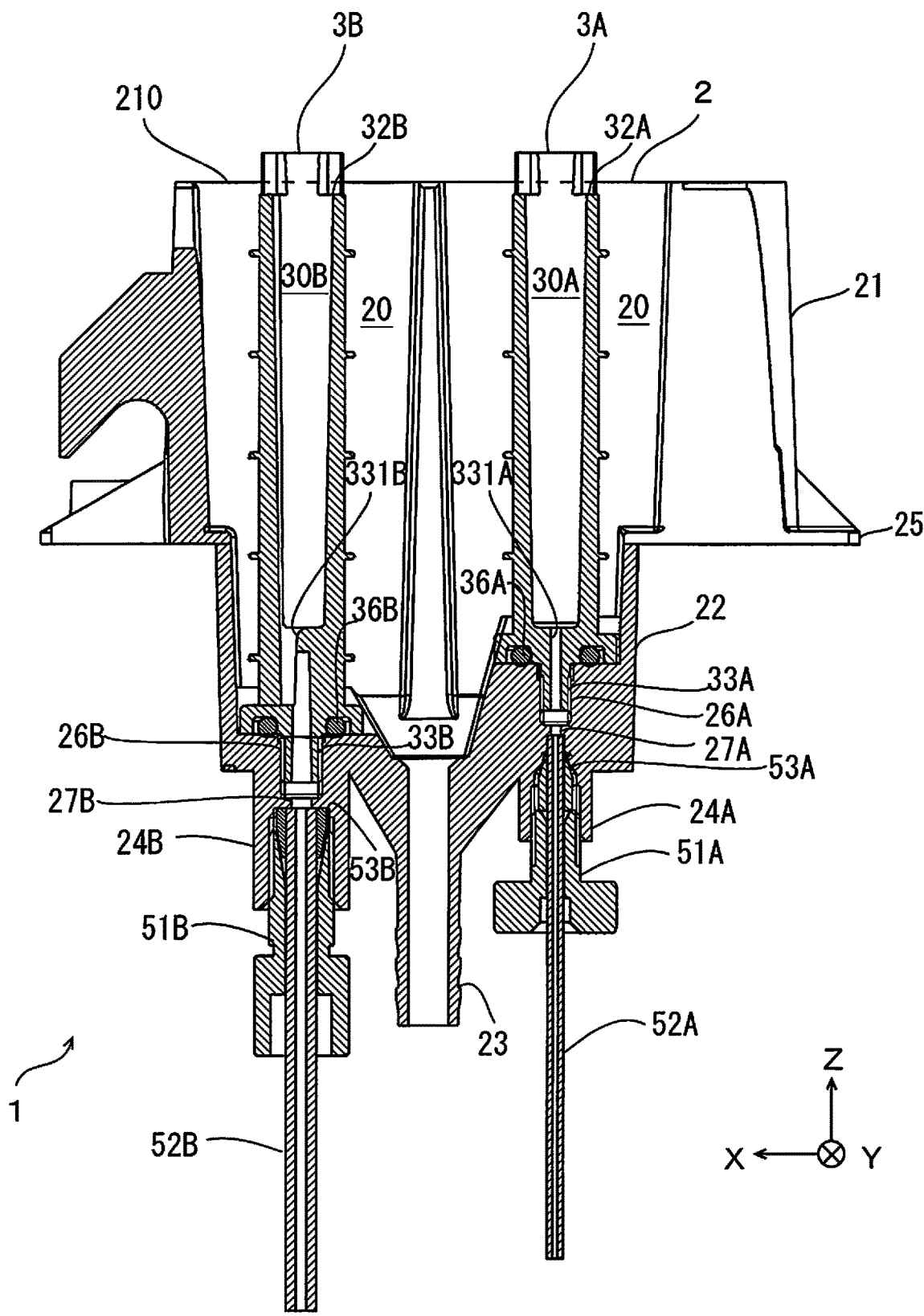
FIG. 3 is a cross sectional side view of the rinse port 1.

The overall configuration of the rinse port 1 according to the present embodiment will be described below next. FIG. 2 is a side view of the rinse port 1. FIG. 3 is a cross sectional side view of the rinse port 1. FIG. 4 is a plan view of the rinse port 1. In FIGS. 2 to 4 and subsequent reference diagrams, arrows indicating an X direction, a Y direction and a Z direction, which are orthogonal to one another, are depicted in order to clarify positional relationships. The X direction and the Y direction are orthogonal to each other within a horizontal plane, and the Z direction corresponds to an up-and-down direction. While an up-and-down direction of the rinse port 1 by itself cannot be decided, an up-and-down direction in a case where the rinse port 1 is attached to a predetermined position of the autosampler 7 is described as an up-and-down direction of the rinse port 1 in the following description.

As shown in FIGS. 2 to 4, the rinse port 1 includes a rinse port main body 2 and the cleaning containers 3A, 3B. As shown in FIGS. 3 and 4, the cleaning containers 3A, 3B are arranged in the X direction at intervals. The rinse port main body 2 includes a main body upper portion 21 and a main body lower portion 22. The main body upper portion 21 and the main body lower portion 22 are integrally formed. The main body upper portion 21 has a cylindrical shape with open upper and lower ends. The opening at the upper end of the main body upper portion 21 is a unit opening 210 at the upper end of the rinse port main body 2. The needle 73 accesses the cleaning containers 3A, 3B via the unit opening 210. As shown in FIG. 3, the main body upper portion 21 stores the cleaning containers 3A, 3B. As shown in FIG. 2, the upper ends of the cleaning containers 3A, 3B are arranged at positions further upward than the upper end of the main body upper portion 21. The main body lower portion 22 is shaped to have an open upper end. As shown in FIG. 3, the main body lower portion 22 supports the lower ends of the cleaning containers 3A, 3B. An inner space 20 of the rinse port main body 2 is formed of an inner space of the main body upper portion 21 and an inner space of the main body lower portion 22. The inner space 20 receives a cleaning liquid that has overflowed from the cleaning containers 3A, 3B.

As shown in FIGS. 2 and 3, a first supply port 24A, a second supply port 24B and a liquid drainage port 23 that are cylindrical projections extending downwardly from the lower end of the main body lower portion 22 are provided in a lower portion of the main body lower portion 22. As shown in FIG. 3, the first supply port 24A is located below the cleaning container 3A. The main body lower portion 22 opens downwardly through a columnar inner space in the first supply port 24A. The second supply port 24B is located below the cleaning container 3B. The main body lower portion 22 opens downwardly via a columnar inner space in the second supply port 24B. The liquid drainage port 23 is located between the first supply port 24A and the second supply port 24B in the X direction. The main body lower portion 22 opens in the columnar inner space of the liquid drainage port 23. The liquid drainage port 23 is connected to the inner space 20.

As shown in FIG. 3, the upper end of the liquid sending tube 52A is inserted into the first supply port 24A. The liquid sending tube 52A is fixed to the main body lower portion 22 by fastening members 51A and 53A. A screw thread is formed on the inner wall of the cylindrical member of the first supply port 24A, and a screw thread is formed on the outer periphery of the fastening member 51A. Further, in each of the fastening members 51A and 53A, a tube insertion hole penetrating in the up-and-down direction is formed in a rotation center axis portion, and the liquid sending tube 52A is inserted into this tube insertion hole. With this structure, the fastening members 51A and 53A hold the liquid sending tube 52A, and the fastening member 51A is fixed to the main body lower portion 22 by the screw structure.

The upper end of the liquid sending tube 52B is inserted into the second supply port 24B. The liquid sending tube 52B is fixed to the main body lower portion 22 by the fastening members 51A and 53B. A screw thread is formed on the inner wall of the cylindrical member of the second supply port 24B, and a screw thread is formed on the outer periphery of the fastening member 51B. Further, in each of the fastening members 51B and 53B, a tube insertion hole penetrating in the up-and-down direction is formed in a rotation center axis portion, and the liquid sending tube 52B is inserted into this tube insertion hole. With this structure, the fastening members 51B and 53B hold the liquid sending tube 52B, and the fastening member 51B is fixed to the main body lower portion 22 by the screw structure.

(3) CONFIGURATION OF RINSE PORT MAIN BODY

Figure 5:
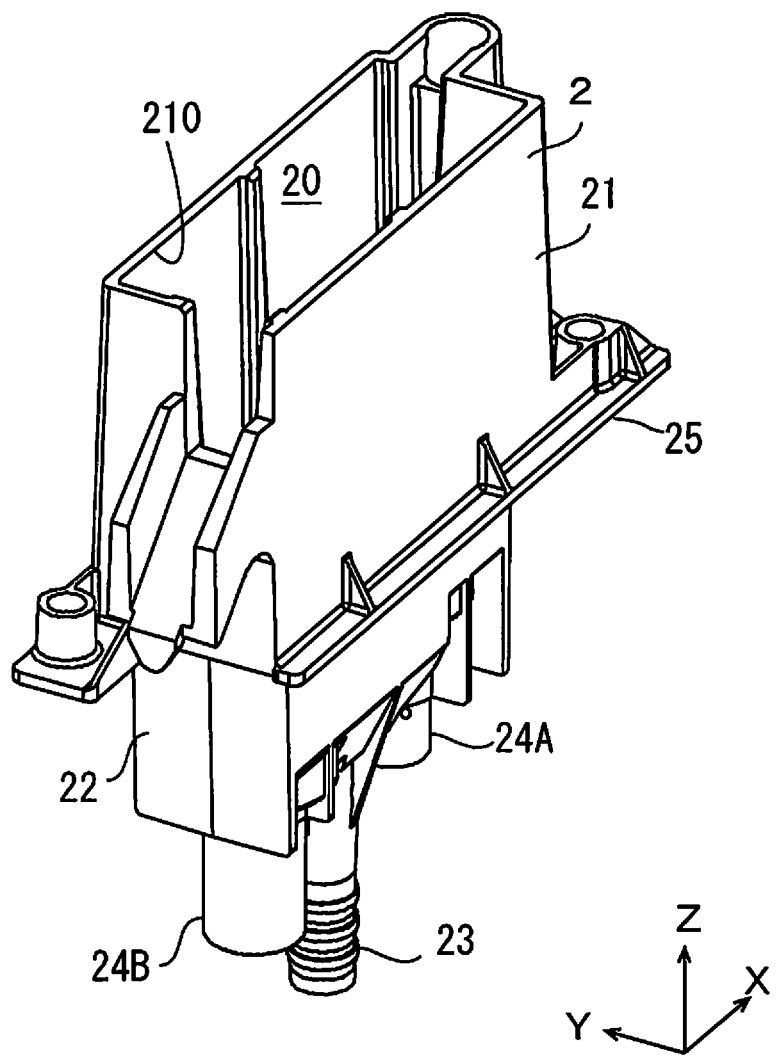
FIG. 5 is a perspective view of a rinse port main body 2 according to the present embodiment as viewed from a position obliquely farther upward than the rinse port main body 2.
Figure 6:
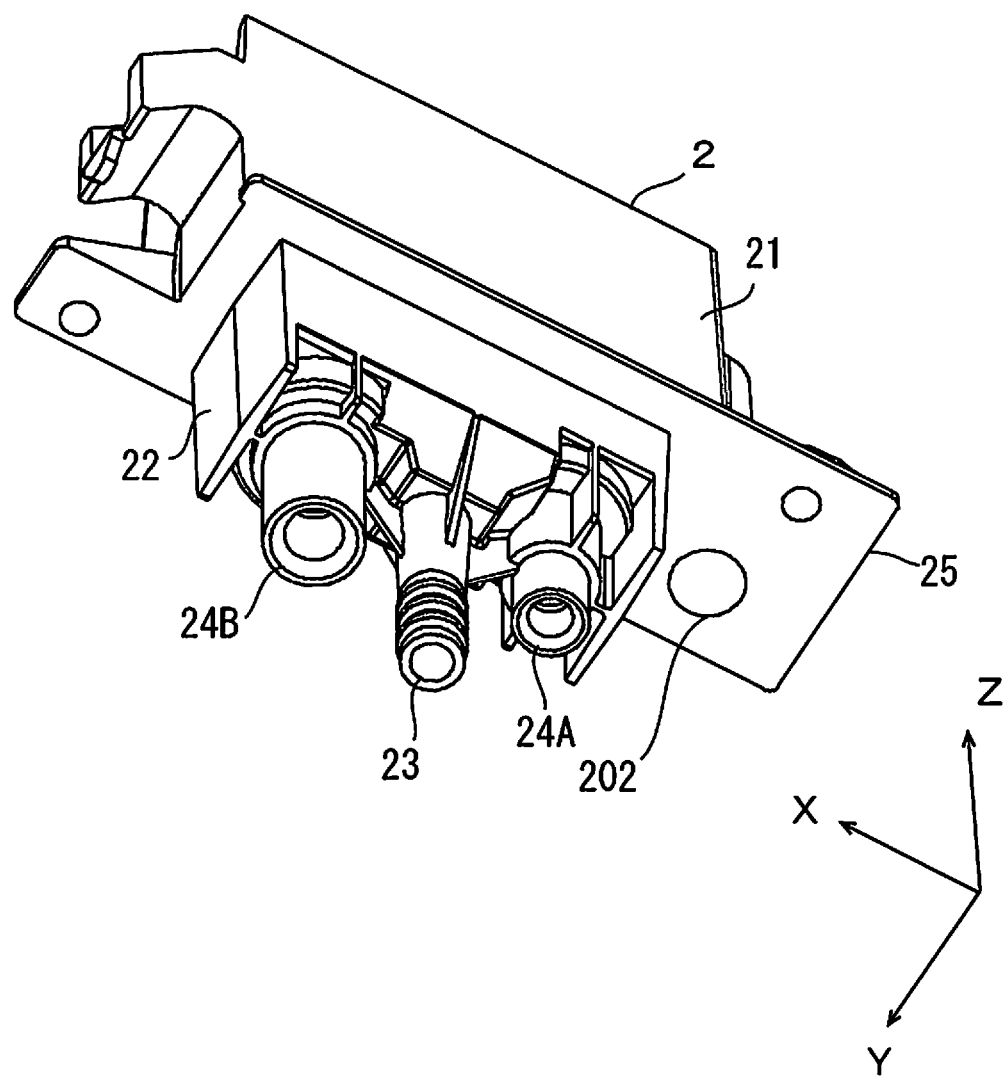
FIG. 6 is a perspective view of the rinse port main body 2 as viewed from a position obliquely farther downward than the rinse port main body 2.
Figure 8:
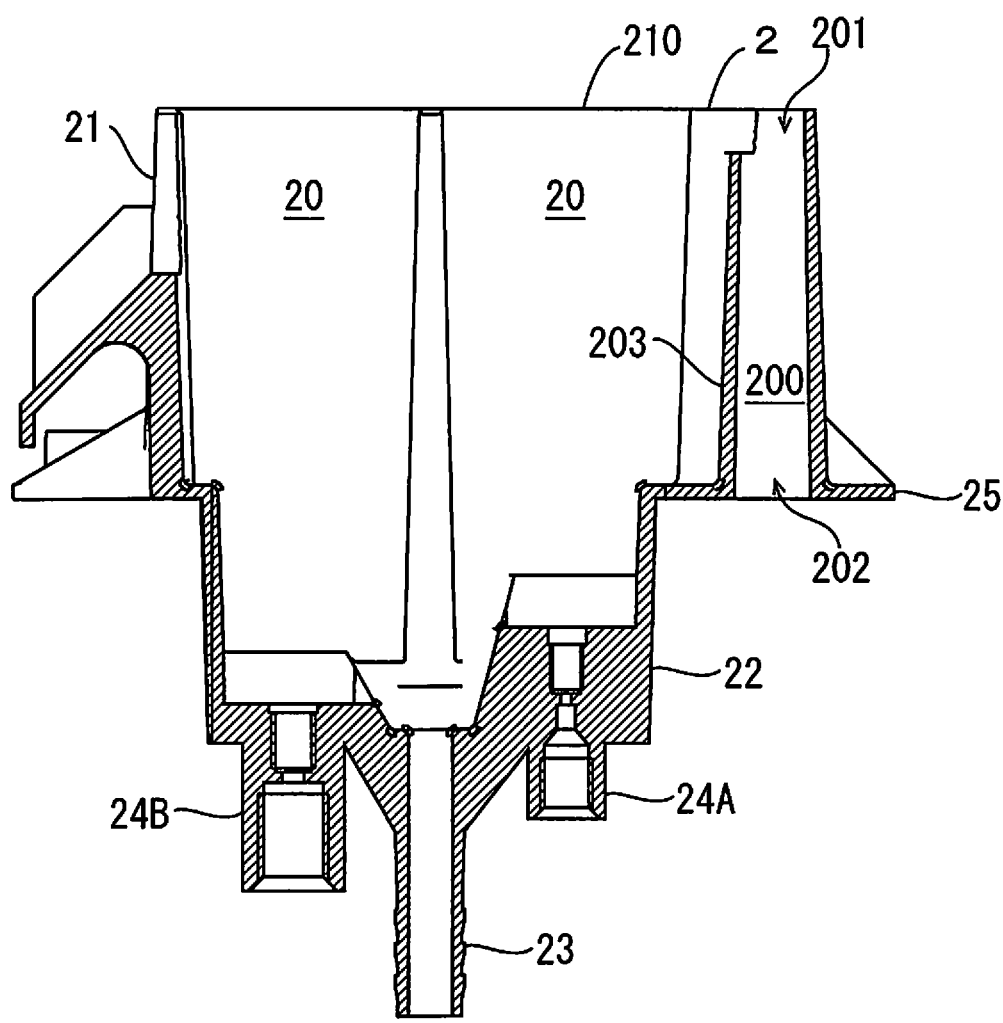
FIG. 8 is a cross sectional side view of the rinse port main body 2.

The configuration of the rinse port main body 2 will be described next with reference to FIGS. 5 to 8. FIG. 5 is a perspective view of the rinse port main body 2 as viewed from a position obliquely farther upward than the rinse port main body 2, and FIG. 6 is a perspective view of the rinse port main body 2 as viewed from a position obliquely farther downward than the rinse port main body 2. FIG. 7 is a plan view of the rinse port main body 2. FIG. 8 is a cross sectional side view of the rinse port main body 2.

As shown in FIG. 5, the main body upper portion 21 has a substantially cuboid shape and has an inner space 20 having a substantially cuboid shape. The inner space 20 opens upwardly via the unit opening 210. An attachment plate 25 is provided between the main body upper portion 21 and the main body lower portion 22. A plurality of bolt holes are provided in the attachment plate 25. The attachment plate 25 is bolted to the boundary portion 702 in the autosampler 7, whereby the rinse port main body 2 is fixed to the boundary portion 702 in the autosampler 7.

As shown in FIG. 6, the liquid drainage port 23, the first supply port 24A and the second supply port 24B extend downwardly from the lower end of the main body lower portion 22. The attachment plate 25 is provided in an upper portion of the main body lower portion 22. The attachment plate 25 has a substantially oblong outer shape. A gas exhaust port 202 is provided in the attachment plate 25. The function of the gas exhaust port 202 will be described below in detail.

As shown in FIG. 7, the rinse port main body 2 has the inner space 20 that is substantially oblong in a plan view. FIG. 7 is a diagram of the rinse port 1 with the cleaning containers 3A, 3B detached from the rinse port 1 shown in FIG. 4. Container attachment holes 26A, 26B are provided in the bottom surface of the main body lower portion 22. As described below, screw threads for fixing the cleaning containers 3A, 3B are formed on the inner peripheral surfaces of the container attachment holes 26A, 26B.

A gas exhaust port 201 is provided at the end of the inner space 20. A unit gas exhaust passage 200 is provided close to the gas exhaust port 201. The gas exhaust port 201 is connected to the unit gas exhaust passage 200. The function of the gas exhaust port 201 and the unit gas exhaust passage 200 will be described below in detail.

As shown in FIG. 8, the rinse port main body 2 includes a partition wall 203 inside of the main body upper portion 21. The partition wall 203 extends in the up-and-down direction and sections the space inside of the main body upper portion 21 into the inner space 20 and the unit gas exhaust passage 200. The unit gas exhaust passage 200 is a space extending in the up-and-down direction. The inner space 20 and the unit gas exhaust passage 200 are connected to each other via the gas exhaust port 201 near the upper end of the main body upper portion 21. Further, the lower end of the unit gas exhaust passage 200 opens outwardly of the rinse port main body 2 via the gas exhaust port 202. As shown in FIG. 6, the gas exhaust port 202 opens downwardly in the lower surface of the attachment plate 25.

(4) CONFIGURATION OF CLEANING CONTAINER

Figure 9:
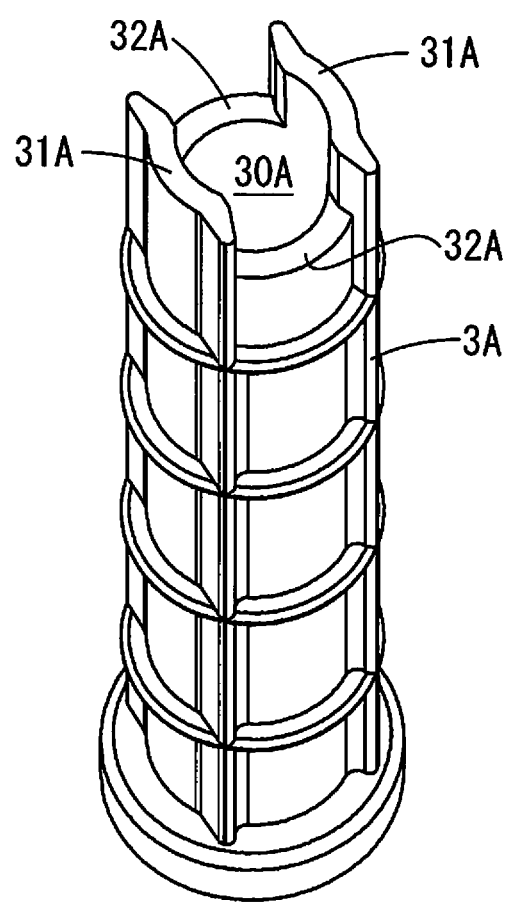
FIG. 9 is a perspective view of a cleaning container 3A according to the present embodiment as viewed from a position obliquely farther upward than the cleaning container 3A.
Figure 10:
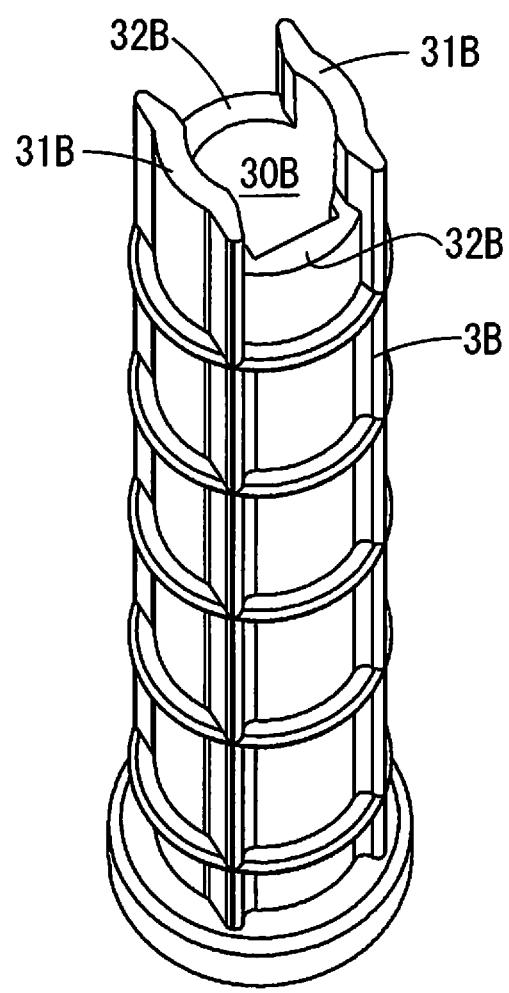
FIG. 10 is a perspective view of a cleaning container 3B according to the present embodiment as viewed from a position obliquely farther upward than the cleaning container 3B.

Next, the configuration of the cleaning containers 3A, 3B will be described with reference to FIGS. 9 and 10. FIG. 9 is a perspective view of the cleaning container 3A as viewed from a position obliquely farther upward than the cleaning container 3A. FIG. 10 is a perspective view of the cleaning container 3B as viewed from a position obliquely farther upward than the cleaning container 3B. While the up-and-down direction of the cleaning containers 3A, 3B by themselves cannot be decided, an up-and-down direction in a case where the cleaning containers 3A, 3B are stored in the rinse port main body 2 and the rinse port 1 is attached to the autosampler 7 is described as an up-and-down direction of the cleaning containers 3A, 3B in the following description.

As shown in FIG. 9, the cleaning container 3A has a cylindrical outer shape. A storage 30A that stores a cleaning liquid is formed inside of the cleaning container 3A. Two projections 31A, 31A are provided at the upper end of the cleaning container 3A. Two grooves 32A, 32A are formed between the two projections 31A, 31A. As shown in FIG. 10, the cleaning container 3B also has a cylindrical outer shape. In the present embodiment, the length of the cleaning container 3B in the up-and-down direction is larger than the length of the cleaning container 3A in the up-and-down direction. A storage 30B that stores a cleaning liquid is formed inside of the cleaning container 3B. Two projections 31B, 31B are provided at the upper end of the cleaning container 3B. Two grooves 32B, 32B are formed between the two projections 31B, 31B.

Further, as shown in FIG. 3, attachment portions 33A, 33B are provided at the lower ends of the cleaning containers 3A, 3B. The attachment portions 33A, 33B are cylindrical members, and screw threads are formed on their outer peripheries. Cleaning liquid supply paths 331A, 331B are formed near the centers of cylinders of the attachment portions 33A, 33B. The cleaning liquid supply paths 331A, 331B are connected to the storages 30A, 30B, respectively.

(5) ASSEMBLY CONFIGURATION OF RINSE PORT

As shown in FIGS. 3 and 7, container attachment holes 26A, 26B are provided in the main body lower portion 22 of the rinse port main body 2. The container attachment holes 26A, 26B are cylindrical holes, and screw threads are formed on their inner peripheral surfaces. The attachment portion 33A of the cleaning container 3A is inserted into the container attachment hole 26A and screwed, whereby the cleaning container 3A is fixed to the main body lower portion 22 of the rinse port main body 2. The attachment portion 33B of the cleaning container 3B is inserted into the container attachment hole 26B and screwed, whereby the cleaning container 3B is fixed to the main body lower portion 22 of the rinse port main body 2. In this manner, the lower ends of the cleaning containers 3A, 3B are fixed to the main body lower portion 22, and the cleaning containers 3A, 3B are stored in the inner space 20 of the rinse port main body 2. As shown in FIG. 3, O-rings 36A, 36B are fitted into the lower portions of the cleaning containers 3A, 3B, and closure between the storages 30A, 30B and the inner space 20 is ensured.

Further, as described above with reference to FIG. 3, with the liquid sending tube 52A inserted into the tube insertion holes of the fastening members 51A, 53A, the fastening member 51A is screwed into the first supply port 24A. Thus, the liquid sending tube 52A is connected to the main body lower portion 22 of the rinse port main body 2. In this state, the liquid sending tube 52A is connected to the cleaning liquid supply path 331A through a flow path 27A in the main body lower portion 22. With the above-mentioned configuration, the liquid sending tube 52A is connected to the storage 30A of the cleaning container 3A through the flow path 27A and the cleaning liquid supply path 331A.

Further, as described above with reference to FIG. 3, with the liquid sending tube 52B inserted into the tube insertion holes of the fastening members 51B, 53B, the fastening member 51B is screwed into the second supply port 24B. Thus, the liquid sending tube 52B is connected to the main body lower portion 22 of the rinse port main body 2. In this state, the liquid sending tube 52B is connected to the cleaning liquid supply path 331B through the flow path 27B in the main body lower portion 22. With the above-mentioned configuration, the liquid sending tube 52B is connected to the storage 30B of the cleaning container 3B through the flow path 27B and the cleaning liquid supply path 331B.

Further, as described above with reference to FIG. 1, the liquid sending tubes 52A, 52B are connected to the pumps 75A, 75B, respectively. With the above-mentioned configuration, when the pumps 75A, 75B are driven, the cleaning liquid stored in the cleaning liquid tanks 76A, 76B are sent to the first and second supply ports 24A, 24B through the liquid sending tubes 52A, 52B. As shown in FIG. 3, the cleaning liquid that has been sent to the first supply port 24A through the liquid sending tube 52A flows into the storage 30A of the cleaning container 3A through the flow path 27A and the cleaning liquid supply path 331A. As shown in FIG. 3, the cleaning liquid that has been sent to the second supply port 24B through the liquid sending tube 52B flows into the storage 30B of the cleaning container 3B through the flow path 27B and the cleaning liquid supply path 331B.

(6) CLEANING PROCESS

The rinse port 1 that is configured as described above is stored in the autosampler 7 as shown in FIG. 1. The needle 73 has a driver (not shown) and moves among the sample vials 72, the rinse port 1 and the injection port 74 based on the control by a controller (not shown). The needle 73 is cleaned in either the cleaning container 3A or 3B in the rinse port 1 based on the control by the controller.

The needle 73 is cleaned in the cleaning container 3A or 3B, after the needle 73 collects a sample in a sample vial 72, for example. Before the needle 73 is cleaned in the cleaning container 3A or 3B, the cleaning container 3A or 3B that is to be utilized for cleaning is filled with a cleaning liquid. The needle 73 is cleaned by the cleaning liquid by accessing the cleaning container 3A or 3B from above. The needle 73 enters the cleaning container 3A or 3B, so that a sample or the like adhering to its peripheral surface is washed away.

After injecting a sample into the injection port 74 by the needle 73, for example, the needle 73 is cleaned in the cleaning container 3A or 3B. Alternatively, the needle 73 is cleaned in the cleaning container 3A or 3B before the step of collecting a next sample. Also in this case, the cleaning container 3A or 3B to be utilized for cleaning is filled with a cleaning liquid before the needle 73 is cleaned in the cleaning container 3A or 3B. The needle 73 is cleaned by the cleaning liquid by accessing the cleaning container 3A or 3B from above. The needle 73 enters the cleaning container 3A or 3B, so that a sample or the like adhering to its peripheral surface is washed away. Alternatively, the needle 73 sucks and discharges the cleaning liquid in the cleaning container 3A or 3B, so that the inside of the needle 73 is cleaned.

When the pump 75A or the pump 75B is driven, and an additional cleaning liquid is supplied to the cleaning container 3A or 3B, the cleaning liquid in the cleaning container 3A or 3B overflows from the upper end of the cleaning container 3A or 3B. The overflowing cleaning liquid flows into the inner space 20 of the rinse port main body 2. The cleaning liquid that has flowed into the inner space 20 flows into the liquid drainage tube 55 via the liquid drainage port 23. The cleaning liquid that has flowed into the liquid drainage tube 55 is collected in the liquid drainage tank 77.

In the present embodiment, the cleaning containers 3A, 3B are individually detachable from the rinse port main body 2 as described above. Therefore, different types of materials can be used as a material for the cleaning container 3A and a material for the cleaning container 3B. As the materials for the cleaning containers 3A, 3B, PEEK (polyetheretherketone), stainless and ceramic can be used, for example. As one example, a combination of PEEK being used as a material for the cleaning container 3A and stainless being used as a material for the cleaning container 3B is possible.

In the present embodiment, PPS (Poly Phenylene Sulfide) is used as a material for the rinse port main body 2. It is desirable that the rinse port main body 2 has excellent chemical resistance because the rinse port main body 2 receives an overflowing cleaning liquid from the cleaning containers 3A, 3B. While metal such as stainless may be used as a material for the rinse port main body 2 from this point of view, PPS is used in the present embodiment from the viewpoint of processability.

(7) STRUCTURE OF GROOVES

As shown in FIGS. 4, 9 and so on, the two projections 31A, 31A are provided at the upper end of the cleaning container 3A, and the two grooves 32A, 32A are formed between the two projections 31A, 31A. As shown in FIGS. 4, 10 and so on, the two projections 31B, 31B are provided at the upper end of the cleaning container 3B, and the two grooves 32B, 32B are formed between the two projections 31B, 31B.

When the cleaning containers 3A, 3B are fastened to the rinse port main body 2, an operator can attach and detach the cleaning containers 3A, 3B by making a tool be engaged with the upper ends of the cleaning containers 3A, 3B. The grooves 32A, 32B at the upper ends of the cleaning containers 3A, 3B also serve as flow paths from which a cleaning liquid flows when the cleaning liquid overflows.

(8) CONFIGURATION OF RINSE PORT COVER

Figure 11:
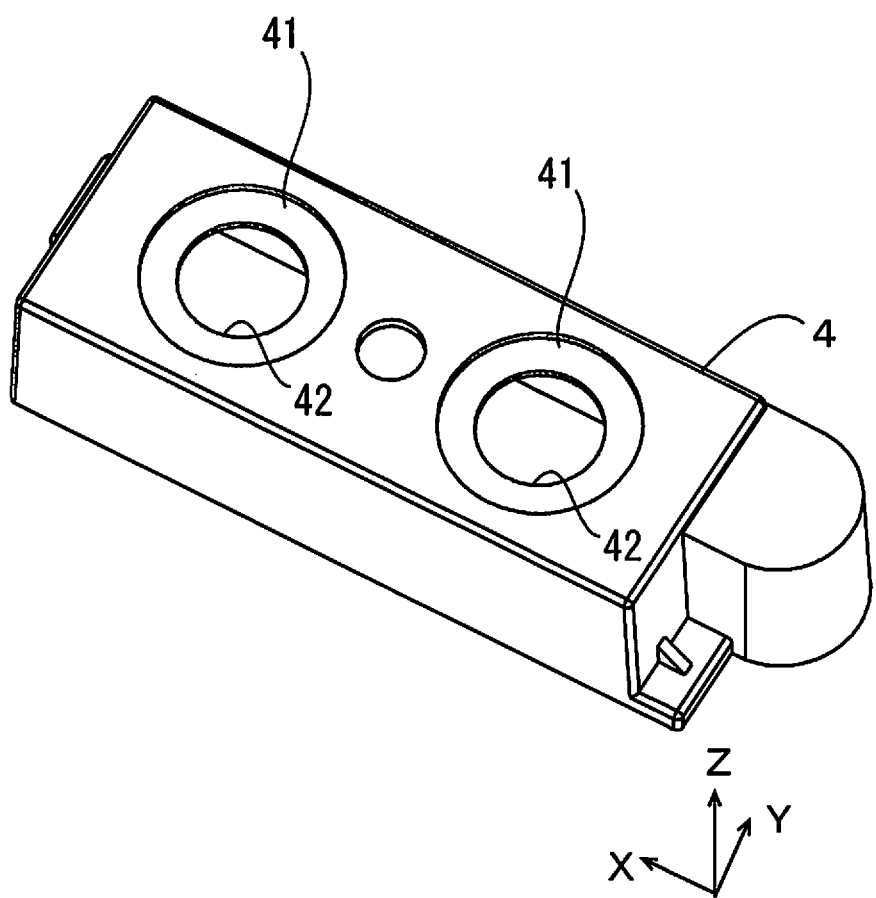
FIG. 11 is a perspective view of a rinse port cover 4 according to the present embodiment.
Figure 12:
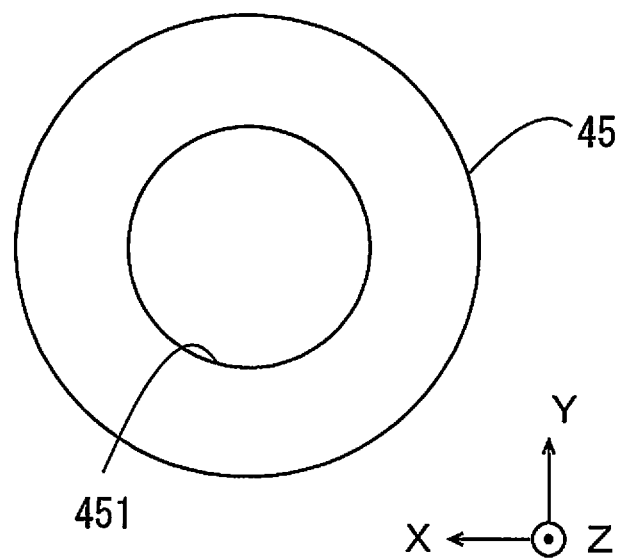
FIG. 12 is a plan view showing a cover cap 45 according to the present embodiment.
Figure 13:
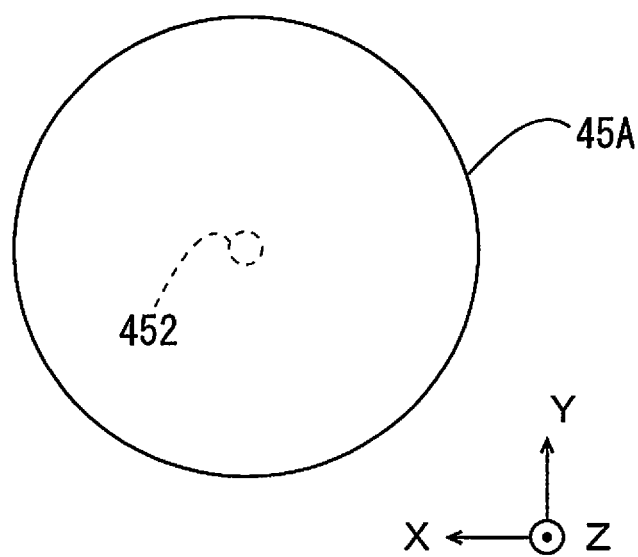
FIG. 13 is a plan view showing a cover cap 45A according to the present embodiment.

Next, the configuration of a rinse port cover 4 will be described. FIG. 11 is a perspective view of the rinse port cover 4. FIG. 12 is a plan view of a cover cap 45. FIG. 13 is a plan view of a cover cap 45A. While the up-and-down direction of the rinse port cover 4 and the cover caps 45, 45A by themselves cannot be decided, the up-and-down direction in a case where the rinse port cover 4 and the cover caps 45, 45A are attached to the rinse port main body 2 and the rinse port 1 is attached to the autosampler 7 is described as an up-and-down direction of the rinse port cover 4 and the cover caps 45, 45A in the following description.

As shown in FIG. 11, the rinse port cover 4 has a substantially cuboid outer shape. A substantially entire lower portion of the rinse port cover 4 is opened. FIG. 2 shows the rinse port cover 4 being attached to the upper portion of the rinse port main body 2. The lower opening of the rinse port cover 4 is connected to the unit opening 210 at the upper end of the main body upper portion 21 of the rinse port main body 2. Thus, the rinse port cover 4 covers the unit opening 210 of the main body upper portion 21. In other words, the rinse port cover 3 covers the inner space 20 of the rinse port main body 2 from above.

As shown in FIG. 11, two cap insertion grooves 41, 41 are formed at the upper surface of the rinse port cover 4. A cap insertion groove 41 is a circular groove in a plan view. A cap insertion groove 41 has a depth corresponding to the thickness of the cover cap 45 in the up-and-down direction. An opening 42 is provided at the center of a cap insertion groove 41.

As shown in FIG. 12, the cover cap 45 is circular in a plan view. The cover cap 45 can be attached to a cap insertion groove 41 of the rinse port cover 4. The diameter of a cap insertion groove 41 is substantially equal to the diameter of the cover cap 45 or slightly smaller than the diameter of the cover cap 45. With this configuration, the cover cap 45 is pushed into a cap insertion groove 41, so that the cover cap 45 is held by the cap insertion groove 41.

As shown in FIG. 12, an insertion hole 451 for the needle 73 is provided at the center of the cover cap 45. When the cover cap 45 is attached to the rinse port cover 4, the position of the insertion hole 451 overlaps with the opening 42 of the rinse port cover 4 in a plan view. Thus, the needle 73 passes through the rinse port cover 4 through the insertion hole 451 and accesses the cleaning containers 3A, 3B stored in the rinse port 1.

In the present embodiment, two types of cover caps 45, 45A can be utilized. As shown in FIG. 13, the cover cap 45A is circular in a plan view. The cover cap 45A can be attached to a cap insertion groove 41 of the rinse port cover 4. The diameter of a cap insertion groove 41 is substantially equal to the diameter of the cover cap 45A or slightly smaller than the diameter of the cover cap 45A. With this configuration, the cover cap 45A is pushed into a cap insertion groove 41, so that the cover cap 45A is held by the cap insertion groove 41.

Differently from the cover cap 45 shown in FIG. 12, an insertion hole for the needle 73 is not provided at the center of the cover cap 45 before use. When the cover cap 45A is used for the first time, the needle 73 breaks through a hole region 452, so that an insertion hole for the needle 73 is formed. Thereafter, the needle 73 accesses the cleaning containers 3A, 3B via the formed insertion hole.

As a material for the rinse port cover 4 and the cover caps 45, 45A, PP (polypropylene) or PE (polyethylene) is used, for example.

(9) GAS EXHAUST STRUCTURE

Figure 14:
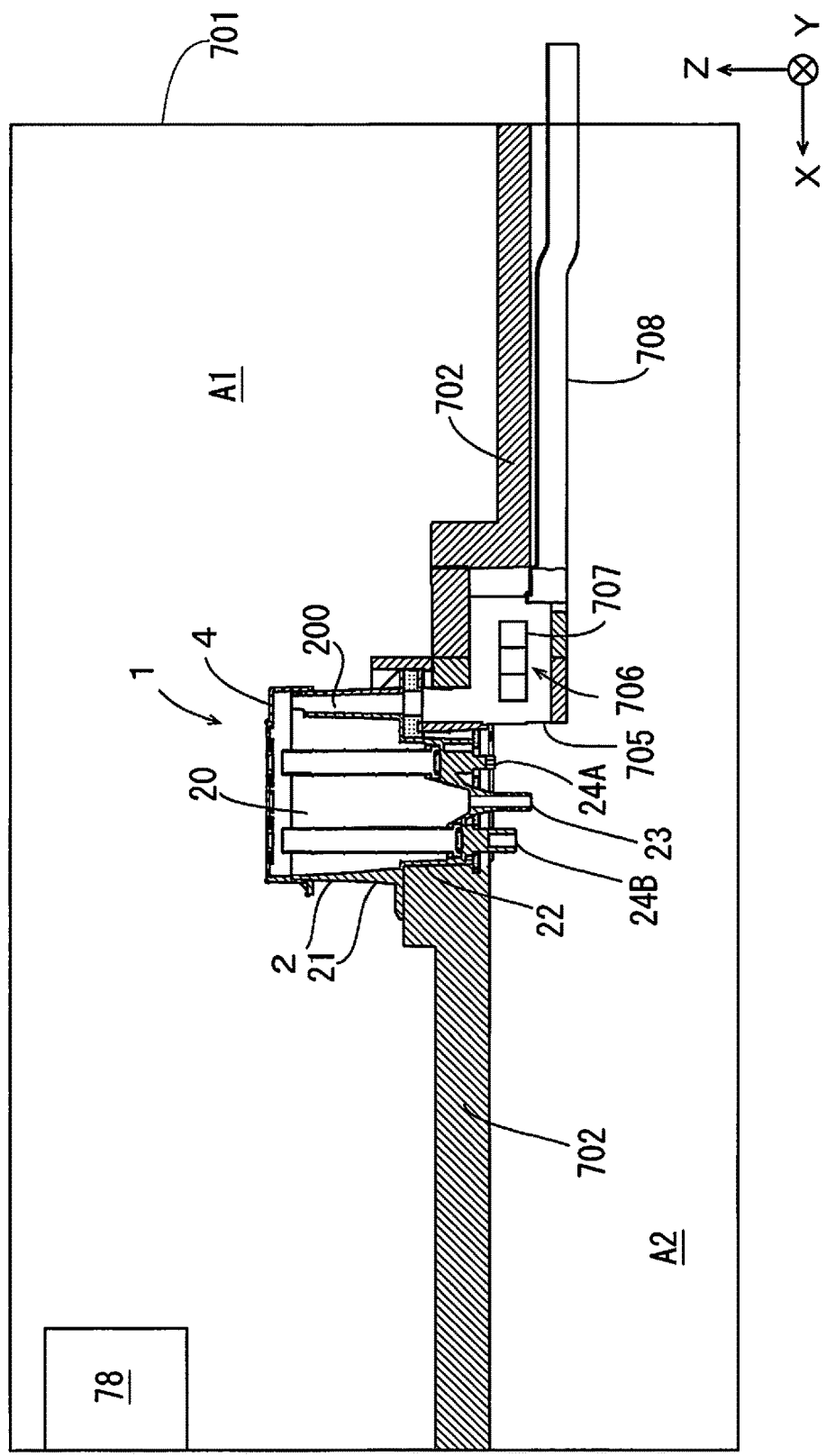
FIG. 14 is a cross sectional side view of an autosampler 7 according to the present embodiment.

The structure for exhausting gas vaporized from the rinse port 1 will be described next with reference to FIGS. 14 to 17. FIG. 14 is a cross sectional side view of the autosampler 7. As described above, the autosampler 7 has the casing 701. Further, the autosampler 7 has the boundary portion 702. The space in the autosampler 7 is sectioned into the first region A1 and the second region A2 by the boundary portion 702. The boundary portion 702 is a boundary extending in the X direction and the Y direction. Thus, the space in the autosampler 7 is sectioned into the first region A1 located above the boundary portion 702 and the second region A2 located below the boundary portion 702.

As shown in the diagram, the main body upper portion 21 of the rinse port main body 2 is arranged in the first region A1. The cooling system 78 is attached to the casing 701 in the first region A1. Further, although not shown in FIG. 14, the sample plate 71, the needle 73 and the injection port 74 are also arranged in the first region A1.

Figure 15:
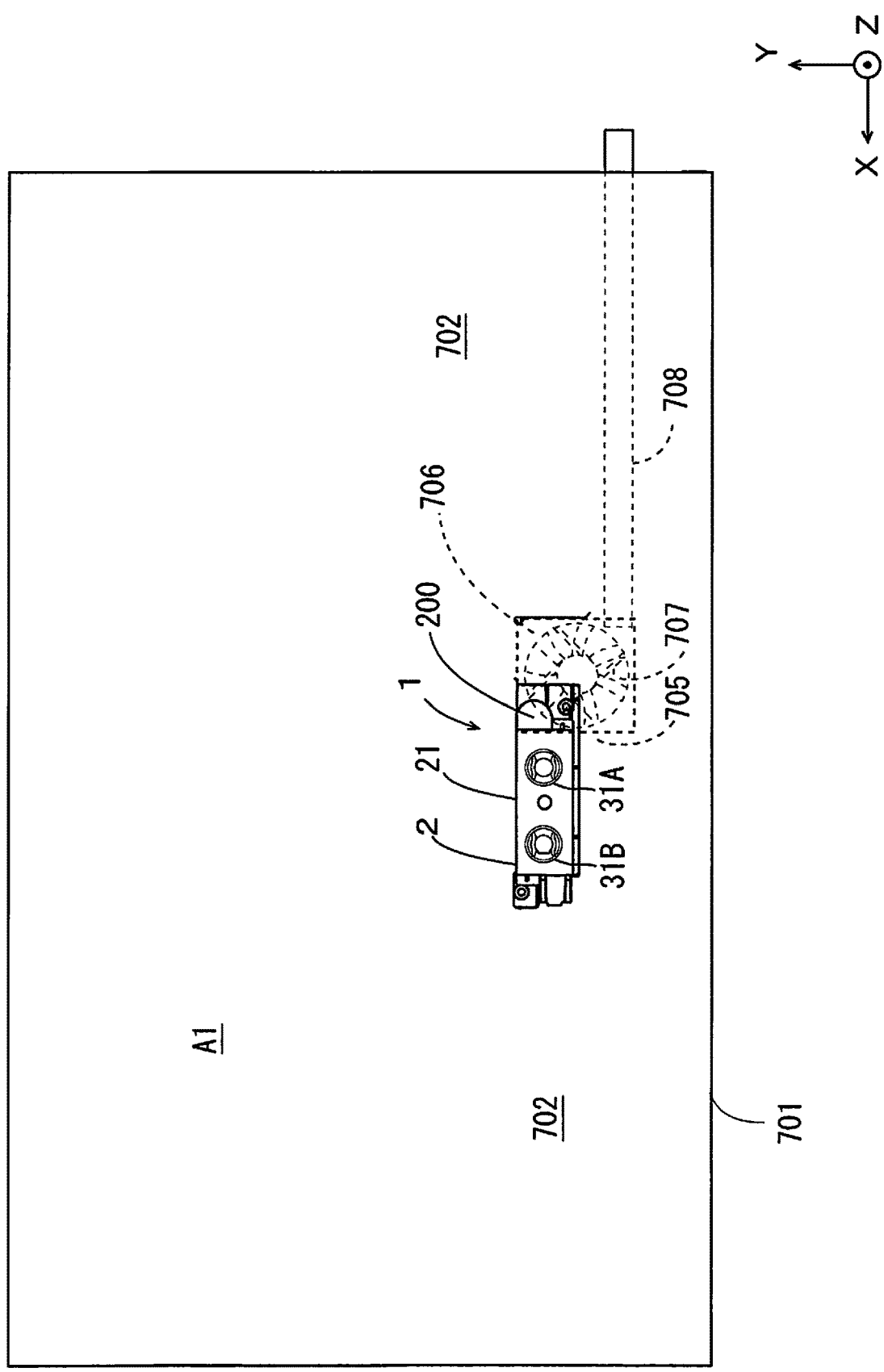
FIG. 15 is a plan view of the autosampler 7 according to the present embodiment.

FIG. 15 is a plan view showing the inside of the autosampler 7. Four side portions of the autosampler 7 are covered by the casing 701. While the upper surface of the casing 701 is not shown in FIG. 15, the upper portion of the autosampler 7 is covered by the upper surface of the casing 701. As shown in FIG. 15, the first region A1 is a substantially oblong region in a plan view. The main body upper portion 21 of the rinse port main body 2 is arranged in the first region A1. Further, while not shown in FIG. 15, the sample plate 71, the needle 73 and the injection port 74 are arranged in the first region A1 (see FIG. 1).

Figure 16:
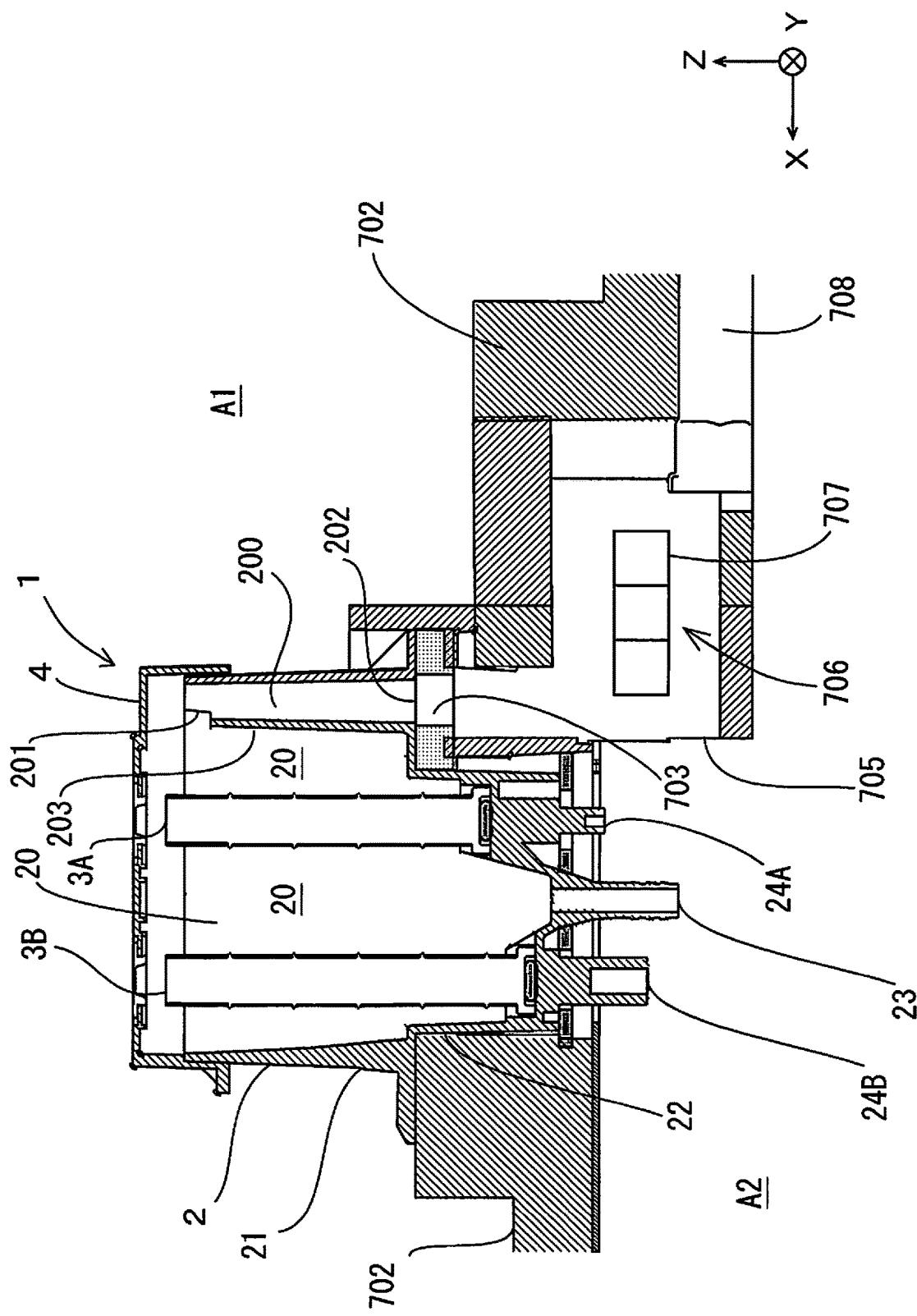
FIG. 16 is a partially enlarged diagram of FIG. 14.

FIG. 16 is a partially enlarged view of FIG. 14. As shown in FIG. 16, the rinse port 1 is attached to the upper surface of the boundary portion 702. As described above with reference to FIG. 5, the attachment plate 25 of the rinse port main body 2 is bolted to the boundary portion 702 in the autosampler 7, whereby the rinse port main body 2 is fixed to the boundary portion 702.

As shown in FIG. 16, the main body lower portion 22 of the rinse port main body 2 is arranged at the boundary portion 702. The first supply port 24A, the second supply port 24B and the liquid drainage port 23 that project downwardly from the lower end of the rinse port main body 2 are arranged in the second region A2. While not shown in FIG. 16, the liquid sending tube 52A connected to the first supply port 24A, the liquid sending tube 52B connected to the second supply port 24B and the liquid drainage tube 55 connected to the liquid drainage port 23 are arranged in the second region A2. The liquid sending tube 52A, the liquid sending tube 52B and the liquid drainage tube 55 extend outwardly of the autosampler 7, and their end portions are arranged in the cleaning liquid tanks 76A, 76B and the liquid drainage tank 77 (see FIG. 1).

As shown in FIG. 16, a gas exhaust opening 703 is provided at the boundary portion 702. The gas exhaust opening 703 is connected to the gas exhaust port 202 at the lower end of the unit gas exhaust passage 200 of the rinse port main body 2. Further, the lower end of the gas exhaust opening 703 is connected to a gas exhaust chamber 705 in the second region A2. With this structure, the inner space 20 of the rinse port 1 is connected to a gas exhaust region 706 in the gas exhaust chamber 705 via the gas exhaust port 201, the unit gas exhaust passage 200, the gas exhaust port 202 and the gas exhaust opening 703.

As shown in FIG. 16, a gas exhaust fan 707 is provided in the gas exhaust chamber 705. When the gas exhaust fan 707 is driven, the gas in the inner space 20 of the rinse port 1 flows into the gas exhaust region 706 via the gas exhaust port 201, the unit gas exhaust passage 200, the gas exhaust port 202 and the gas exhaust opening 703.

Further, an external gas exhaust passage 708 is connected to the gas exhaust chamber 705 at a position farther downstream than the exhaust fan 707. As shown in FIGS. 14 and 15, the external gas exhaust passage 708 extends in the X direction in the second region A2, and its end opens outwardly of the casing 701.

Figure 17:
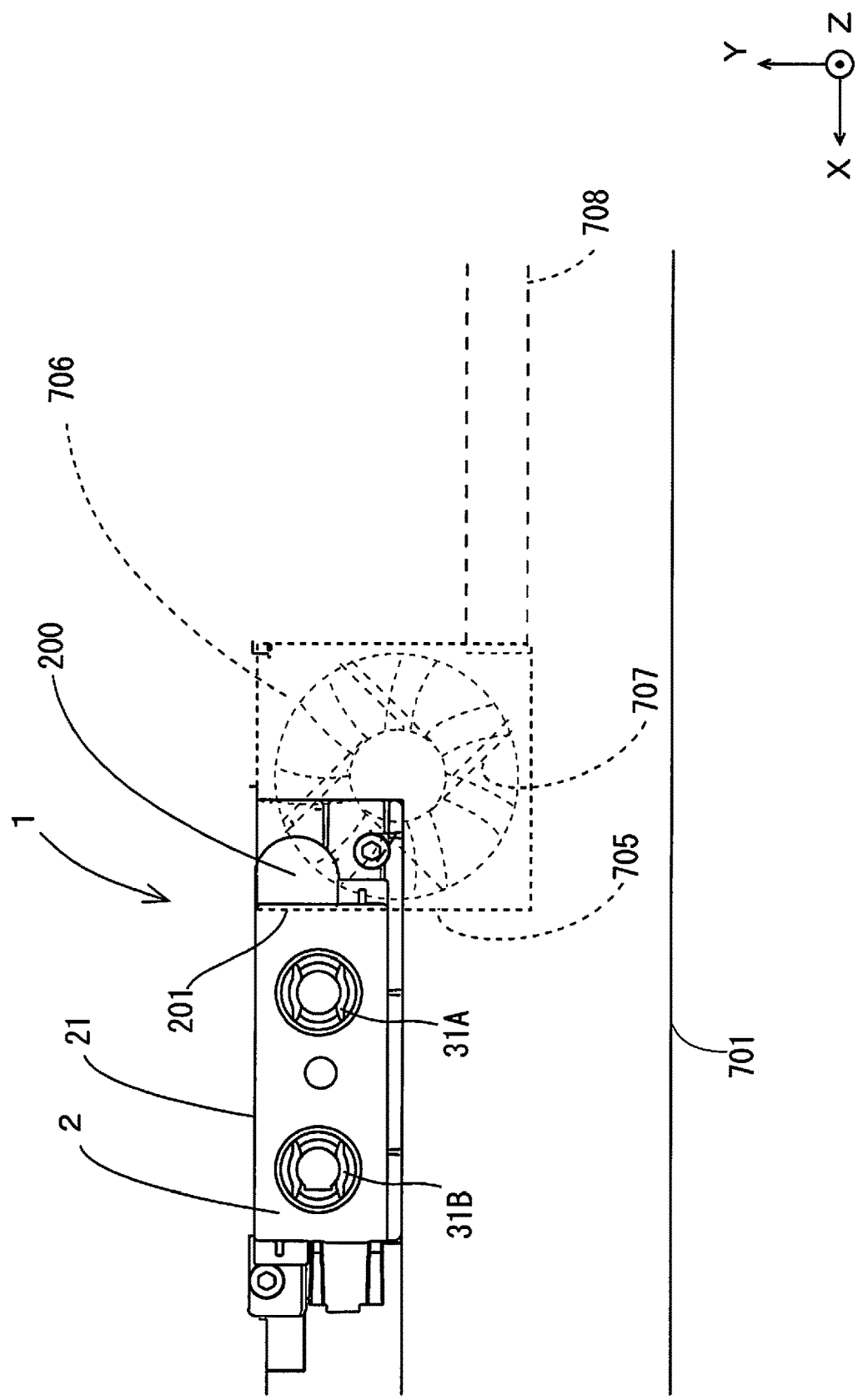
FIG. 17 is a partially enlarged diagram of FIG. 15.

FIG. 17 is a partially enlarged diagram of FIG. 15. As shown in FIG. 17, the gas exhaust chamber 705 is arranged below the unit gas exhaust passage 200. The gas exhaust fan 707 is arranged in the gas exhaust region 706 in the gas exhaust chamber 705. The external gas exhaust passage 708 is connected to the gas exhaust chamber 705.

With above-mentioned configuration, the gas in the gas exhaust region 706 is exhausted outwardly of the autosampler 7 through the external gas exhaust passage 708 by the pressure generated by the gas exhaust fan 707. That is, when the gas exhaust fan 707 is driven, the gas in the inner space 20 of the rinse port 1 is exhausted outwardly of the autosampler 7 via the gas exhaust port 201, the unit gas exhaust passage 200, the gas exhaust port 202, the gas exhaust opening 703, the gas exhaust region 706 and the external gas exhaust passage 708.

As described above, the autosampler 7 of the present embodiment is sectioned into the first region A1 in which the injection port 74, the needle 73 and the unit opening 210 are arranged and the second region A2 in which the gas exhaust fan 707 is arranged by the boundary portion 702. The inner space 20 of the rinse port 1 is connected to the gas exhaust region 706 of the second region A2 through the unit gas exhaust passage 200 in the rinse port 1. The gas in the inner space 20 of the rinse port 1 is exhausted due to a negative pressure generated by the gas exhaust fan 707 to the gas exhaust region 706 in the second region A2 through the unit gas exhaust passage 200 and the gas exhaust opening 703 provided at the boundary portion 702.

The gas in the rinse port 1 is exhausted due to a negative pressure generated by the gas exhaust fan 707 to the second region A2 through the unit gas exhaust passage 200 in the rinse port 1, so that the gas in the rinse port 1 is prevented from flowing out from the unit opening 210. Thus, the gas that has flowed out from the unit opening 210 is prevented from filling the first region A1. Even in a case where a highly corrosive liquid such as chlorine is used as the cleaning liquid, a vaporized gas is prevented from filling the first region A1. Thus, rusting of a metallic member in the first region A1 due to a highly corrosive gas is prevented.

With the autosampler 7 of the present embodiment, the gas that flows out from the rinse port 1 does not fill the first region A1. Therefore, it is not necessary to provide a gas exhaust fan at the side surface of the casing 701 of the autosampler 7 and ventilate the first region A1 as conventionally done, and a period of time required to ventilate the first region A1 is shortened. Further, because the autosampler 7 does not ventilate the first region A1 by a gas exhaust fan, cooling performance of the first region A1 is not lowered.

Further, as described above, the rinse port main body 2 has the unit opening 210 through which the needle 73 passes when accessing the cleaning containers 3A, 3B. Further, the rinse port 1 has the rinse port cover 4 that covers the unit opening 210 while enabling the needle 73 to access the cleaning containers 3A, 3B.

Because the autosampler 7 in the present embodiment has the rinse port cover 4 that covers the unit opening 210 of the rinse port 1, the gas in the rinse port 1 is further prevented from filling the first region A1. Rusting of a metallic member in the first region A1 due to a highly corrosive gas is effectively prevented.

Further, the rinse port cover 4 is provided on the path through which the needle 73 passes when accessing the cleaning containers 3A, 3B and has the cover caps 45, 45A provided to enable the needle 73 to access the cleaning containers 3A, 3B.

Because the rinse port cover 4 has the cover cap 45 on the path through which the needle 73 passes, the gas in the rinse port 1 is further prevented from filling the first region A1. Further, while a portion through which the needle 73 passes in the rinse port cover 4 may be contaminated by a sample or the like, it is possible to remove a contaminated portion by replacing the cover caps 45, 45A.

Further, because the cover cap 45 has an insertion hole 451 through which the needle 73 passes, the inner space 20 in the rinse port 1 is separated from the first region A1 except for a portion including the insertion hole 451 through which the needle 73 passes.

Further, the cover cap 45A has the hole region 452 in which a hole through which the needle 73 passes and which is formed when the cover cap 45A is pierced by the needle 73. A hole through which the needle passes is not present until the needle 73 passes through. The inner space 20 in the rinse port 1 is more effectively separated from the first region A1. The gas in the rinse port 1 is further effectively prevented from flowing into the first region A1.

Further, as described above, the autosampler 7 has the external gas exhaust passage 708 through which the gas flowing into the gas exhaust region 706 from the inner space 20 due to a negative pressure generated by the gas exhaust fan 707 is sent outwardly of the autosampler 7. The gas that has flowed into the gas exhaust region of the second region A2 is further sent outwardly of the autosampler 7. A member in the second region A2 is also prevented from being contaminated by gas.

(10) CORRESPONDENCES BETWEEN CONSTITUENT ELEMENTS IN CLAIMS AND PARTS IN PREFERRED EMBODIMENTS

In the following paragraphs, non-limiting examples of correspondences between various elements recited in the claims below and those described above with respect to various preferred embodiments of the present disclosure are explained. In the above-mentioned embodiment, the rinse port 1 is an example of a cleaning unit, and the rinse port main body 2 is an example of a unit main body. Further, the gas exhaust port 201 is an example of a partition wall opening.

As each of constituent elements recited in the claims, various other elements having configurations or functions described in the claims can be also used.

(11) OTHER EMBODIMENTS

While the rinse port 1 is configured to have the two cleaning containers 3A, 3B by way of example in the above-mentioned embodiment, the number of cleaning containers is not limited to this. The number of cleaning containers stored in the rinse port 1 may be one or three or more.

While the gas exhaust port 202 and the gas exhaust opening 703 are connected directly to each other by way of example in the above-mentioned embodiment, the gas exhaust port 202 and the gas exhaust opening 703 may be connected to each other through a tube, a pipe, etc. Further, while the gas exhaust port 201 that is a partition wall opening is provided at the upper end of the partition wall 203 in the above-mentioned embodiment, a partition wall opening does not have to be provided at the upper end of the partition wall 203. A partition wall opening may be a hole provided in the vicinity of the upper portion of the partition wall 203.

While the unit opening 210 is covered by the rinse port cover 4 by way of example in the above-mentioned embodiment, the rinse port cover 4 is not required. Even in a case where the rinse port cover 4 is configured not to be attached, gas is prevented from filling the first region A1 due to a negative pressure generated by the gas exhaust fan 707. For example, attachment or non-attachment of the rinse port cover 4 may be selected based on whether a highly corrosive cleaning liquid is used.

In the above-mentioned embodiment, the gas in the inner space 20 of the rinse port 1 is exhausted to the gas exhaust region 706 in the second region A2 due to a negative pressure generated by the gas exhaust fan 707. As another method, the gas in the rinse port 1 may be exhausted to the second region A2 due to a positive pressure generated by the gas exhaust fan. In this case, two passages connecting the second region A2 to the inner space 20 are prepared. A fan is arranged in the second region A2, and a positive pressure is generated in the inner space 20 through one passage by a positive pressure generated by the fan. The gas in the inner space 20 is exhausted to the second region A2 through the other passage by a positive pressure generated by the fan. Also with this method, the gas in the rinse port 1 can be prevented from filling the autosampler 7.

The invention claimed is:

1. An autosampler that supplies a sample to an analysis device, comprising:
   an injection port for supplying the sample to be analyzed to the analysis device;
   a needle that collects the sample to be analyzed stored in a vial and injects the sample to be analyzed into the injection port;
   a cleaning unit that cleans the needle; and
   a gas exhaust fan, wherein
   the cleaning unit includes
   a cleaning container which stores a cleaning liquid and into which the needle that needs to be cleaned is inserted in the stored cleaning liquid, and
   a unit main body that has a space for storing the cleaning container and receiving the cleaning liquid overflowing from the cleaning container, and a unit gas exhaust passage for exhausting gas in the space outwardly of the cleaning unit,
   the unit main body has a unit opening through which the needle passes when accessing the cleaning container, and
   the autosampler further includes
   a boundary portion that separates a first region in which the injection port, the needle and the unit opening are arranged from a second region in which the gas exhaust fan is arranged, and
   a gas exhaust region which is connected to the unit gas exhaust passage via a gas exhaust opening provided at the boundary portion and into which gas exhausted from the space flows due to a negative pressure generated by the gas exhaust fan.

2. The autosampler according to claim 1, wherein
   the unit main body has a partition wall that separate the space from the unit gas exhaust passage, and
   gas in the space is exhausted to the unit gas exhaust passage via a partition wall opening provided at the partition wall.

3. The autosampler according to claim 1, wherein
   the unit gas exhaust passage extends in an up-and-down direction.

4. The autosampler according to claim 2, wherein
   the partial wall opening is provided at an upper end of the partition wall.

5. The autosampler according to claim 1, wherein
   the cleaning unit includes a cleaning unit cover that covers the unit opening while enabling the needle to access the cleaning container.

6. The autosampler according to claim 5, wherein
   the cleaning unit cover is provided on a path through which the needle passes when accessing the cleaning container, and has a cap provided to enable the needle to access the cleaning container.

7. The autosampler according to claim 6, wherein
   the cap has a hole through which the needle passes.

8. The autosampler according to claim 6, wherein
   the cap has a hole region in which a hole through which the needle passes is to be formed when the cap is pierced by the needle.

9. The autosampler according to claim 1, further comprising an external gas exhaust passage through which gas that has flowed into the gas exhaust region from the space due to a negative pressure generated by the gas exhaust fan is sent outwardly of the autosampler.

* * * * *